United States Patent [19]

Emmerling et al.

[11] Patent Number: 4,824,888
[45] Date of Patent: Apr. 25, 1989

[54] DIURETHANES AS STABILIZING ADDITIVES IN SEALING COMPOUNDS

[75] Inventors: Winfried Emmerling, Erkrath; Tore Podola, Monheim; Juergen Wichelhaus, Wuppertal, all of Fed. Rep. of Germany

[73] Assignee: Henkel Kommanditgesellschaft auf Aktien, Duesseldorf, Fed. Rep. of Germany

[21] Appl. No.: 189,852

[22] Filed: May 3, 1988

[30] Foreign Application Priority Data

May 4, 1987 [DE] Fed. Rep. of Germany ....... 3714768

[51] Int. Cl.$^4$ ................................................. C08K 5/16
[52] U.S. Cl. ...................................... 524/199; 524/569
[58] Field of Search ............... 524/199, 567, 568, 569, 524/912; 525/129; 560/158, 166

[56] References Cited

U.S. PATENT DOCUMENTS

| | | | |
|---|---|---|---|
| 2,528,398 | 10/1950 | Strain | 524/199 |
| 2,647,916 | 8/1953 | Kaiser | 560/166 |
| 2,879,230 | 3/1959 | Newman et al. | 560/166 |
| 3,350,332 | 10/1967 | Hardy et al. | 525/129 |
| 3,813,841 | 5/1974 | Elliott et al. | 560/166 |
| 3,852,255 | 12/1974 | Bentz et al. | 524/199 |
| 4,123,413 | 10/1978 | Mark et al. | 524/199 |
| 4,163,088 | 7/1979 | Kunzel et al. | 560/158 |

Primary Examiner—Veronica P. Hoke
Attorney, Agent, or Firm—Ernest G. Szoke; Wayne C. Jaeschke; Henry E. Millson, Jr.

[57] ABSTRACT

Diurethanes corresponding to general formula (I) or (II) below

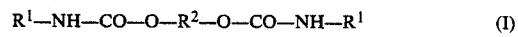

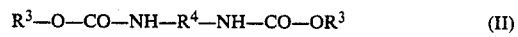

$$R^1-NH-CO-O-R^2-O-CO-NH-R^1 \quad (I)$$

$$R^3-O-CO-NH-R^4-NH-CO-OR^3 \quad (II)$$

in which $R^1$ is a $C_3$–$C_{22}$ alkyl or aralkyl radical or a phenyl radical, $R^2$ is a residue of a difunctional polypropylene glycol having a number average molecular weight of from 1000 to 4000, $R^3$ is the residue of a monofunctional polypropylene glycol monoalkyl ether having a number average molecular weight of from 500 to 2000, and $R^4$ is $C_4$–$C_{36}$ alkylene group, a diaryl methane group or a tolylidene group, as stabilizing agents for sealing compositions, for isocyanate-terminated polyurethane prepolymers, and for polyvinyl chlorides and copolymers of vinyl chloride.

14 Claims, No Drawings

DIURETHANES AS STABILIZING ADDITIVES IN SEALING COMPOUNDS

BACKGROUND OF THE INVENTION

1. Field of the Invention

This invention relates to the use of diurethanes as stabilizing additives in sealing compounds.

2. Statement of Related Art

Sealing compounds are widely used in practice in the assembly of objects of various kinds. They can be hardened by moisture hardening in wich isocyanate groups enter into a crosslinking reaction as reactive terminal groups of prepolymers. It is also known that plastisols can be used for similar purposes, in which case hardening is carried out by a thermal reaction. However, systems of this type can also gel and ultimately harden on their own over prolonged periods either at room temperature or at moderately elevated temperature.

One of the disadvantages of these moisture-hardening systems is that, even in the substantial absence of air and moisture, they are not sufficiently stable. They will undergo an increase in viscosity through crosslinking after a few months to such an extent that they can no longer be processed by the usual means.

High-quality polyurethane systems, of the type used as sealing compounds in the building and automotive industry and in ship building, often contain swellable PVC powder as a thixotropic filler. Compared with other known fillers, such as chalk, silica and carbon black, this filler has an extremely low water content which does not adversely affect the storability of the isocyanate-containing compositions. In addition, it provides the end product with excellent rheological properties. The swelling agents and plasticizers used for PVC are, primarily, alkyl benzenesulfonic acid esters or phthalic acid esters, for example dioctyl phthalate. However, the above isocyanate systems have the disadvantage that the combination of swollen PVC and platicizer tends to continue swelling in the composition, particularly when it is stored at relatively high temperatures. As a result, there is a considerable increase in viscosity which interferes seriously with processing.

In attempts to prevent this continued swelling with standard stabilizing additives, such as polyisobutylene for example, it was found that, through the incompatibility of these apolar compounds with the isocyanate prepolymers, migration of these substances adversely affected the appearance of the hardened compositions.

Another disadvantage of these polyurethane systems is that, due to the viscosity of the prepolymers used, it is only possible to use a relatively narrow, preferably low molecular weight range, because prepolymers of relatively high viscosity cannot be diluted with the plasticizer normally used because a relatively high plasticizer content would adversely affect the swelling behavior of the PVC. However, it is precisely high-viscosity prepolymers which show the desired, particularly favorable mechanical properties after hardening. Accordingly, there is a need to solve the above problems.

DESCRIPTION OF THE INVENTION

Other than in the operating examples, or where otherwise indicated, all numbers expressing quantities of ingredients or reaction conditions used herein are to be understood as modified in all instances by the term "about".

An object of the present invention is to provide stabilizers for isocyanate-terminated prepolymers used in joint sealing compounds which, on the one hand, retard or prevent the crosslinking reaction of the isocyanate-terminated prepolymers themselves and, on the other hand, do not adversely affect the swelling behavior of the PVC or other copolymers of vinyl chloride with other comonomers used for the same purpose, and even retard premature swelling in the solvents used to a considerable extent.

According to the invention, this object is achieved by the use of one or more diurethanes corresponding to general formula (I) or (II) below

$$R^1-NH-CO-O-R^2-O-CO-NH-R^1 \quad (I)$$

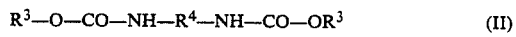

$$R^3-O-CO-NH-R^4-NH-CO-OR^3 \quad (II)$$

in which $R^1$ is a $C_3$-$C_{22}$ alkyl radical, a $C_7$-$C_{22}$ aralkyl radical, preferably $C_7$-$C_{22}$ phenylalkyl or $C_8$-$C_{22}$ alkylphenyl alkyl, or a phenyl radical, $R^2$ is the residue of a difunctional polypropylene glycol having a number average molecular weight of from 1000 to 4000, $R^3$ is the residue of a monofunctional polypropylene glycol monoalkyl (preferably $C_1$-$C_6$ monoalkyl) ether having a number average molecular weight of from 500 to 2000, and $R^4$ is a $C_4$-$C_{36}$ alkylene group, a diaryl methane group, preferably diphenylmethane or ditolylmethane, or a tolylidene group, as stabilizing additives in sealing compounds based on isocyanate-terminated prepolymers of difunctional and trifunctional polyether or polyester polyols and/or polyvinyl chloride swellable in plasticizers or correspondingly swellable copolymers of vinyl chloride with monomers from the group vinyl acetate, vinyl propionate, alkyl acrylates and alkyl methacrylates in powder form, and also plasticizers for these polymers. In a preferred embodiment, the invention relates to the use of one or more diurethane of formula I or II in a quantity of from 50 to 150% by weight, based on the isocyanate-terminated prepolymers in the sealing compound.

Accordingly, the invention also relates to a sealing composition containing (a) from 20 to 50 parts by weight of an isocyanate-terminated polyurethane prepolymer, (b) from 20 to 40 parts by weight of swellable PVC or a swellable copolymer of vinyl chloride in powder form, (c) from 20 to 40 parts by weight of at least one plasticizer, and (d) from 50 to 150% by weight, based on the isocyanate-terminated polyurethane prepolymer (component (a)) of one or more of the diurethanes of formulae (I) or (II).

The present invention is especially directed to moisture-hardening sealing compounds of the above composition.

The invention also relates to the use of the diurethanes of formulae (I) or (II) as stabilizing agents for the isocyanate-terminated polyurethane prepolymers, wherein from 50 to 150% by weight of diurethane, based on the weight of prepolymers, is mixed with the prepolymer.

The invention also relates to the use of the diurethanes of formulae (I) or (II) as stabilizing agents for polyvinyl chloride homopolymer or copolymer plastisols wherein from 10 to 50% by weight of diurethane, based on the weight of PVC homopolymer or copolymer, is added thereto. Such plastisols have the following composition:

A. from 20 to 40 parts by weight of swellable PVC or a swellable copolymer of vinyl chloride,
B. from 20 to 40 parts by weight of at least one plasticizer,
C. from 10 to 50% by weight, based on component A. of one or more diurethane of formulae (I) or (II), and
D. from 2 to 40 parts by weight of an aromatic hydrocarbon solvent, preferably benzene, toluene, or xylene.

The diurethane used in accordance with the invention can retard the swelling of the PVC, can reduce the viscosity of the prepolymer used, and is optimally compatible therewith, i.e. it does not show any migration phenomena, and also improves the stability of the prepolymers during storage.

The isocyanate-terminated prepolymers referred to above are based on difunctional and trifunctional polyether polyols, and are well known to those skilled in the art of sealing compounds. The starting materials for the production of the prepolymers are, primarily, polyethers of the type obtained by addition of alkylene oxides, such as in particular ethylene oxide and/or propylene oxide, onto dihydric alcohols, such as glycol (ethylene glycol), propylene glycol, and 1,4-butanediol. Corresponding 1,4-ethers of butanediol may also be prepared by ring-opening polymerization of tetrahydrofuran. In addition to the polyethers, the esterification products of glycol, diethylene glycol, propylene glycol, and 1,4-butanediol with dicarboxylic acids, such as adipic acid, sebacic acid, terephthalic acid, phthalic acid, or anhydrides thereof and the like may be used for the production of suitable polyesters containing at least two hydroxyl groups. Polyesters such as these are also widely used in the art and are know as starting materials for the production of isocyanate prepolymers. The number average molecular weights of the starting materials are on average from 250 to 10,000 and preferably from 1000 to 3000.

The starting materials disclosed above are then reacted with diisocyanates in such a molar ratio of NCO groups to hydroxyl groups that an excess of isocyanate is present. Diisocyanates for use herein include the isomeric tolylene diisocyanates, more especially technical mixtures of the 2,4- and 2,6-isomer, diphenylmethane diisocyanate, 1,6-hexamethylene diisocyanate, naphthylene diisocyanate, xylylene diisocyanate, isophorone diisocyanate (2,4,4-trimethyl-1,6-diisocyantohexane) and dimeric 2,4-tolylene diisocyanate. The prepolymers thus obtained should have an isocyanate group content of from 1 to 4% by weight.

It is particularly preferred to use a prepolymer based on difunctional and trifunctional polyether polyols. In this case, polyethers and/or polyesters of the type disclosed above containing two hydroxyl groups and having a number average molecular weight of from 500 to 5000 are reacted with a diisocyanate in the presence of a more than bifunctional low molecular weight hydroxyl compound to such an extent that an isocyanate content of from about 1.5 to 3.5% by weight is obtained. Particularly favorable, hardened compositions showing favorable elastic properties are thereby obtained.

The swellable powder-form polymers and copolymers of vinyl chloride referred to above, which are commercially obtainable, have a K-value of from about 45 to 80 and are well know to those skilled in the art, as are the plasticizers used herein as component (c). The plasticizers referred to above are, primarily, alkyl benzenesulfonic acid alkyl esters and/or phthalic acid alkyl esters. However, aliphatic dicarboxylic acid esters (octyl or isodecyl ester of adipic acid) or so-called polymer plasticizers (polyesters of adipic, sebacic, azelaic and phthalic acid with diols, such as propane, butane and hexanediol, with a molecular weight of from 900 to 5000) and also epoxy plasticizers (epoxidized fatty acid derivatives) are also suitable and can also be used herein.

Aluminosilicates, such as clay and feldspar, crushed dolomite, calcium carbonate, calcium sulfate, calcium oxide, zinc oxide, and the like may optionally be added as fillers to the sealing compositions of the invention. Suitable pigments that can also optionally be added include titanium dioxide, iron oxide, carbon black, and chromium pigments. Stabilizers which can also be used as an optional ingredient are those of the usual types, for example benztriazoles and sterically hindered phenols.

The properties of the sealing compositions according to the invention can be controlled throught control of the quantity of component (d) present therein. Relatively high diurethane contents favorably affect viscosity, i.e. the viscosity does not increase as quickly in storage. Even with high diurethane contents, the starting viscosity will of course be relatively low. This effect on stability is of particular importance for high contents of isocyanate prepolymer, particularly when already branched isocyanate-terminated prepolymers leading to favorable mechanical properties are used. It is thus possible to produce storable sealing compounds which cannot otherwise be obtained under practical conditions.

The invention will be illustrated but not limited by the following examples.

EXAMPLES

Preparation of Diurethanes (A) In a heatable stirred reactor, 450 parts by weight polyoxypropylene glycol 2025 (number average molecular weight 2000), 53.6 parts by weight phenyl isocyanate and 0.05 part by weight dibutyltin dilaurate were stirred under nitrogen at 100° C. The reaction was followed by determination of the NCO content. When no more free NCO could be detected (after about 6 hours), the reaction was terminated. Brookfield viscosity of the end product: 3000 mPa.s at 25° C.

(B) 552 parts by weight polypropylene glycol monobutyl ether (number average molecular weight 1000), 62.5 parts by weight 4,4'-diphenylmethane diisocyanate (MDI) and 0.06 part by weight dibutyltin dilaurate were reacted under the same conditions as in (A). Brookfield viscosity of the end product: 4000 mPa.s at 25° C.

EXAMPLE 1

(Moisture-hardening polyurethane prepolymer)

In a heatable reaction vessel, 450 g polypropylene glycol (number average molecular weight 2000), 450 g ethylene oxide-propylene oxide-ethylene oxide block copolymer (number average molecular weight 2000, containing 10% by weight ethylene oxide), 4.5 g trimethylolpropane and 181.2 g 4,4'-diphenylmethane diisocyanate were reacted in the absence of moisture at 70° to 80° C. until the NCO content had fallen to 1.7%.

The reaction product obtained was mixed with 325 g of the diurethane according to (A) and the resulting mixture stored in the absence of moisture. Immediately after its preparation, the mixture had a Brookfield viscosity at 25° C. of 60 Pa.s. The viscosity rose to 75 Pa.s over a period of 1 week, reaching 85 Pa.s after 4 weeks.

When no diurethane was added to the isocyanate-terminated prepolymer, the viscosity of the isocyanate-terminated prepolymer immediately after its preparation was 100 Pa.s at 25° C., increasing to 160 Pa.s after 1 week and to 330 Pa.s after 4 weeks.

EXAMPLE 2

(Moisture-hardening polyurethane prepolymer containing PVC)

In a heatable mixing vessel provided with a powerful stirrer, a mixture was prepared under nitrogen at 50° C. from 200 parts by weight of a finely powdered PVC emulsion homopolymer (K-value 73), 275 g of the alkyl ($C_{16}$–$C_{18}$) sulfonic acid ester of cresol, 45 g titanium dioxide and 60 g xylene. After the mixture had been stirred for about 1 hour at 50° C., a mixture of 360 g of isocyanate-terminated prepolymer (Example 1) and 325 g of the diurethane according to B) were added.

The extrusion rate of the end product was 205 g/minute after its production, 182 g/minute after 1 week and 120 g/minute after 4 weeks (DIN 52 456).

EXAMPLE 3

(Influence of diurethane on PVC plastisol)

In a planetary dissolver, 120 g of the swellable PVC powder of Example 2, 123.7 g of a $C_{15}$ alkyl sulfonic acid ester, 30 g xylene and 13.8 g of the diurethane of Example A were dispersed for 1 hour in such a way that the internal temperature did not exceed 50° C. The viscous mass was stored at ambient temperature. Viscosity measurement showed whether the mass was stable in storage; the following viscosities (Pa.s) being measured at 25° C.:

| 1 day | 1 month | 2 months | 4 months |
|-------|---------|----------|----------|
| 3400  | 3600    | 4000     | 4160     |

The PVC plastisol showed no signs of continued swelling, even after 4 months.

COMPARISON EXAMPLE (PVC swelling without addition of diurethane)

120 g of the swellable PVC powder, 137.5 g of the $C_{15}$ alkyl sulfonic acid ester and 30 g xylene were dispersed under the same conditions as in Example 1, i.e. the polyurethane extender used in Example 1 was replaced by the same quantity of the PVC plasticizer used. The mass solidified after 1 day at ambient temperature through continued swelling of the PVC plastisol.

We claim:

1. In a sealing composition based on an isocyanate-terminated polyurethane prepolymer, the improvement wherein a viscosity stabilizing quantity of at least one diurethane of one or both of the following formulae is present therein:

$$R^1-NH-CO-O-R^2-O-CO-NH-R^1 \quad (I)$$

$$R^3-O-CO-NH-R^4-NH-CO-OR^3 \quad (II)$$

in which
$R^1$ is a $C_3$–$C_{22}$ alkyl, $C_7$–$C_{22}$ aralkyl, or phenyl radical,
$R^2$ is the residue of a difunctional polypropylene glycol having a number average molecular weight of from about 1000 to about 4000,
$R^3$ is the residue of a monofunctional polypropylene glycol monoalkyl ether having a number average molecular weight of from about 500 to about 2000, and
$R^4$ is a $C_4$–$C_{36}$ alkylene group, a diaryl methane group, or a tolylidene group.

2. The composition of claim 1 wherein $R^1$ is a phenylalkyl radical having from 7 to 22 carbon atoms, or an alkylphenylalkyl radical having from 8 to 22 carbon atoms.

3. The composition of claim 1 wherein $R^4$ is diphenylmethane.

4. A sealing composition comprising
(a) from about 20 to about 50 parts by weight of at least one isocyanate-terminated polyurethane prepolymer,
(b) from about 20 to about 40 parts by weight of a swellable polyvinylchloride or a swellable copolymer of vinyl chloride in powder form,
(c) from about 20 to about 40 parts by weight of at least one plasticizer, and
(d) from about 50 to about 150% by weight, based on component (a), of at least one diurethane of the following formulae:

$$R^1-NH-CO-O-R^2-O-CO-NH-R^1 \quad (I)$$

$$R^3-O-CO-NH-R^4-NH-CO-OR^3 \quad (II)$$

in
which $R^1$ is a $C_3$–$C_{22}$ alkyl, $C_7$–$C_{22}$ aralkyl, or phenyl radical,
$R^2$ is the residue of a difunctional polypropylene glycol having a number average molecular weight of from about 1000 to about 4000,
$R^3$ is the residue of a monofunctional polypropylene glycol monoalkyl ether having a number average molecular weight of from about 500 to about 2000, and
$R^4$ is a $C_4$–$C_{36}$ alkylene group, a diaryl methane group, or a tolyidene group.

5. The composition of claim 4 wherein in component (d) $R^1$ is a phenylalkyl radical having from 7 to 22 carbon atoms or an alkylphenylalkyl radical having from 8 to 22 carbon atoms.

6. The composition of claim 4 wherein in component (d) $R^4$ is diphenylmethane.

7. The composition of claim 4 wherein component (c) is at least one of an alkyl benzenesulfonic acid alkyl ester, a phthalic acid alkyl ester, an aliphatic dicarboxylic acid ester, a polyester of adipic, sebacic, azelaic or phthalic acid with a diol, or an epoxy plasticizer.

8. A composition comprising a mixture of
(A) an isocyanate-terminated polyurethane prepolymer,
(B) A stabilizing-effective quantity of at least one diurethane of one or both of the following formulae:

$$R^1-NH-CO-O-R^2-O-CO-NH-R^1 \quad (I)$$

$$R^3-O-CO-NH-R^4-NH-CO-OR^3 \quad (II)$$

in which
$R^1$ is a $C_3$–$C_{22}$ alkyl, $C_3$–$C_{22}$ aralkyl, or phenyl radical, R² is the residue of a difunctional polypropylene glycol having a number average molecular weight of from about 1000 to about 4000, R³ is the residue of a monofunctional polypropylene glycol monoalkyl ether having a number average molecular weight of from about 500 to about 2000, and R⁴ is a $C_4$–$C_{36}$ alkylene group, a diaryl methane group, or a tolylidene group, wherein from about 50 to about 150% by weight of the at least one diurethane is present, based on the weight of the isocyanate-terminated polyurethane prepolymer in the composition.

9. The composition of claim 8 wherein in component B R¹ is a phenylalkyl radical having from 7 to 22 carbon atoms, or an alkylphenylalkyl radical having from 8 to 22 carbon atoms.

10. The composition of claim 8 wherein in component B R⁴ is diphenylmethane.

11. A plastisol composition comprising

A. from about 20 to about 40 parts by weight of swellable polyvinyl chloride or a swellable copolymer of vinyl chloride, B. from about 20 to about 40 parts by weight of at least one plasticizer, C. from about 10 to about 50% by weight, based on component A., of at least one diurethane of one or both of the formulae:

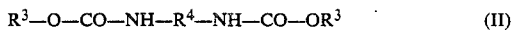

in which

R¹ is a $C_3$–$C_{22}$ alkyl, $C_3$–$C_{22}$ aralkyl, or phenyl radical,

R² is the residue of a difunctional polypropylene glycol having a number average molecular weight of from about 1000 to about 4000, R³ is the residue of a monofunctional polypropylene glycol monoalkyl ether having a number average molecular weight of from about 500 to about 2000, and R⁴ is a $C_4$–$C_{36}$ alkylene group, a diaryl methane group, or a tolylidene group, and D. from about 2 to about 40 parts by weight of an aromatic hydrocarbon solvent.

12. The composition of claim 11 wherein in component C. R¹ is a phenylalkyl radical having from 7 to 22 carbon atoms or alkylphenylalkyl radical having from 8 to 22 carbon atoms.

13. The composition of claim 11 wherein in component C. R⁴ is diphenylmethane.

14. The composition of claim 11 wherein component D. is benzene, toluene, or xylene.

* * * * *